United States Patent
Smith, Jr.

(10) Patent No.: US 6,260,587 B1
(45) Date of Patent: Jul. 17, 2001

(54) FILLER NECK FUME INTERCEPTOR

(76) Inventor: Clarence E. Smith, Jr., 1372 E. 107th St., Los Angeles, CA (US) 90002

( * ) Notice: Subject to any disclaimer, the term of this patent is extended or adjusted under 35 U.S.C. 154(b) by 0 days.

(21) Appl. No.: 09/544,269

(22) Filed: Apr. 6, 2000

(51) Int. Cl.[7] .................................................. B65B 31/00
(52) U.S. Cl. ........................... 141/59; 141/52; 141/86; 141/94; 220/86.2
(58) Field of Search ................. 141/59, 52, 86, 141/94, 65, 66; 220/86.2

(56) References Cited

U.S. PATENT DOCUMENTS

| | | |
|---|---|---|
| 4,759,458 * | 7/1988 | Fischer ............................... 220/86 R |
| 4,874,020 | 10/1989 | Bucci . |
| 4,877,146 * | 10/1989 | Harris ............................... 220/85 VR |
| 5,038,838 * | 8/1991 | Bergamini et al. ................... 141/59 |
| 5,054,520 | 10/1991 | Sherwood et al. . |
| 5,156,178 | 10/1992 | Harris . |
| 5,205,330 | 4/1993 | Sekine . |
| 5,244,022 | 9/1993 | Gimby . |
| 5,305,807 | 4/1994 | Healy . |
| 5,309,957 * | 5/1994 | Saisuu ................................... 141/83 |
| 5,386,811 | 2/1995 | Rochette . |
| 5,462,100 | 10/1995 | Covert et al. . |
| 5,570,730 | 11/1996 | Keehn, Jr. et al. . |
| 5,816,287 | 10/1998 | Hyodo et al. . |
| 5,868,175 * | 2/1999 | Duff et al. ............................. 141/59 |

* cited by examiner

Primary Examiner—Timothy L. Maust
(74) Attorney, Agent, or Firm—Siemens Patent Services, LL

(57) ABSTRACT

A collection and disposal system for intercepting fuel vapor, liquid fuel, and water accumulating at the filler neck compartment of a motor vehicle. The system includes a suction fan, a plurality of conduits communicating between the filler neck compartment and the suction fan, a collector for liquids accumulating in the filler neck compartment, and an electrical control system. The control system includes a switch which operates the suction fan when the filler neck compartment door is open. The suction fan draws vapors from the filler neck compartment through the conduits for disposal. Vapors may be conducted to the emissions control system, in particular the charcoal canister for trapping vapors, a suitable point of the engine such as the intake manifold, carburetor, or throttle body, or may be vented to the open atmosphere. The collector of liquids has a flapper valve which discharges liquids when a predetermined volume is collected. A buzzer is arranged to annunciate operation of the suction fan.

10 Claims, 2 Drawing Sheets

FILLER NECK FUME INTERCEPTOR

BACKGROUND OF THE INVENTION

1. Field of the Invention

The present invention relates to collection and disposal of fumes and liquids from the vicinity of a fuel tank filling neck of a motor vehicle which utilizes a volatile fuel. The vehicle is modified to include powered apparatus for collecting the fumes. The apparatus is interlocked with the cover of the filling neck compartment. The invention finds application in the field of motor vehicles generally which must periodically be filled with liquid fuel. Passenger and freight wheeled vehicles, aircraft, and boats exemplify possible applications for the invention.

2. Description of the Prior Art

Powered motor vehicles which utilize liquid fuels must periodically be refueled. Refueling entails certain hazards due to exposure to fumes of vaporized fuel. Most notably, gasoline fueled vehicles are subject to discharge of hazardous fumes. These fumes are known or suspected to promote cancer among humans, and certainly present fire hazards.

Small gasoline fueled motor vehicles such as passenger cars and light trucks are now required to have apparatus for collecting fuel fumes from fuel tanks. This apparatus typically includes conduits extending from sources of fumes, such as the open interior of the fuel tank, to a trap having, for example, charcoal collector elements. Typical motor vehicle systems of this type rely upon engine manifold vacuum to draw in fumes and conduct the fumes to the collector element or trap. Eventually, fumes collected in the trap will be introduced into the air stream serving the engine, where the fumes will be burned.

This system is considered satisfactory for general purposes, but is operative only when the engine is running, when there is a source of vacuum. Since hazard of ignition of fumes during refueling is great, operating an engine while refueling is not permitted. Therefore, due to lack of vacuum in combination with exposure of fuel being discharged into the filling neck of a fuel tank with the open atmosphere, there exists significant likelihood that gasoline vapors will concentrate at the filler neck and disperse into the air. This will at the least aggravate air pollution and may threaten to present fire hazards.

A fuel vapor recovery system is shown in U.S. Pat. No. 5,244,022, issued to David R. Gimby on Sep. 14, 1993. This system employs a venturi established by flow of fuel when refueling. By contrast, the present invention utilizes an electrically powered fan to induce vacuum. Also, the plural vapor conduits and filler neck door interlock feature of the present invention are not present in the device of Gimby.

U.S. Pat. No. 5,305,807, issued to James W. Healy on Apr. 26, 1994, describes a vapor recovery device for a fuel dispensing system. The device of Healy lacks the filler neck door interlock feature and plural independent, redundant vapor conduits of the present invention.

U.S. Pat. No. 5,570,730, issued to Douglas A. Keehn, Jr., et al. on Nov. 5, 1996, describes a fuel ventilation system for boats. This system lacks a powered suction fan and filler neck door interlock feature of the present invention.

U.S. Pat. No. 5,816,287, issued to Yoshihiko Hyodo et al. on Oct. 6, 1998, describes apparatus for preventing discharge of fuel vapors in motor vehicles. This apparatus lacks a suction fan and filler neck door interlock feature of the present invention.

None of the above inventions and patents, taken either singly or in combination, is seen to describe the instant invention as claimed.

SUMMARY OF THE INVENTION

The present invention provides a powered fumes or vapor interceptor and collector which operates when the associated vehicle is being refueled. Whereas most fume control systems operate when the engine is running, that of the present invention operates with the engine not running, when refueling occurs. It has been hypothesized that significant pollution is unleashed when refueling gasoline fueled vehicles due to vapors which escape to the open atmosphere due to spontaneous evaporation. Of course, although the invention is presented in terms of gasoline fueled vehicles, it is equally applicable to vehicles utilizing any volatile liquid fuel and also gaseous fuels.

The present invention addresses this issue by providing a dedicated powered suction device to collect fumes, controlled by an interlock feature which senses when the fuel tank filling neck compartment door is open. The invention includes plural conduits which open to the filling neck compartment at diverse points, and collect both vapors and liquids which may accumulate. The number of conduits assures that if one or more conduits should become clogged, others will still enable the system to operate. Liquids may include gasoline ejected from the fuel tank due to internal pressure, and water from rain, washing, and other sources. Liquids are discharged by a flapper valve device. Vapors are directed to suitable disposal points, such as intake manifold, charcoal canister for trapping fumes, carburetor, or the throttle body for fuel injected vehicles.

Electrical power is derived from the electrical system of the vehicle. A fan is connected to power and generates vacuum which draws fumes away from the filler neck compartment to a suitable disposal point. While it is preferred to trap the fumes for destructive disposal in the combustion chambers of the engine, it is also possible to discharge the fumes away from the filler neck so they will not be as concentrated as they are at the filler neck. Disposal of fumes will result in reduced exposure to the person attending to fueling, as well as reducing likelihood of a catastrophic fire resulting from ignited fumes.

Accordingly, it is one object of the invention to provide a fume interception and disposal system for disposing of concentrated fuel fumes located at the filler neck of a motor vehicle.

It is another object of the invention to provide a fume interception and disposal system which operates when the engine of the associated vehicle is not running.

It is a further object of the invention to provide plural pick up points and transmission paths for entrapped fumes.

Still another object of the invention is to enable discharge of liquids from the filler neck compartment.

An additional object of the invention is to infer when fueling occurs by monitoring position of the filler neck compartment door.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
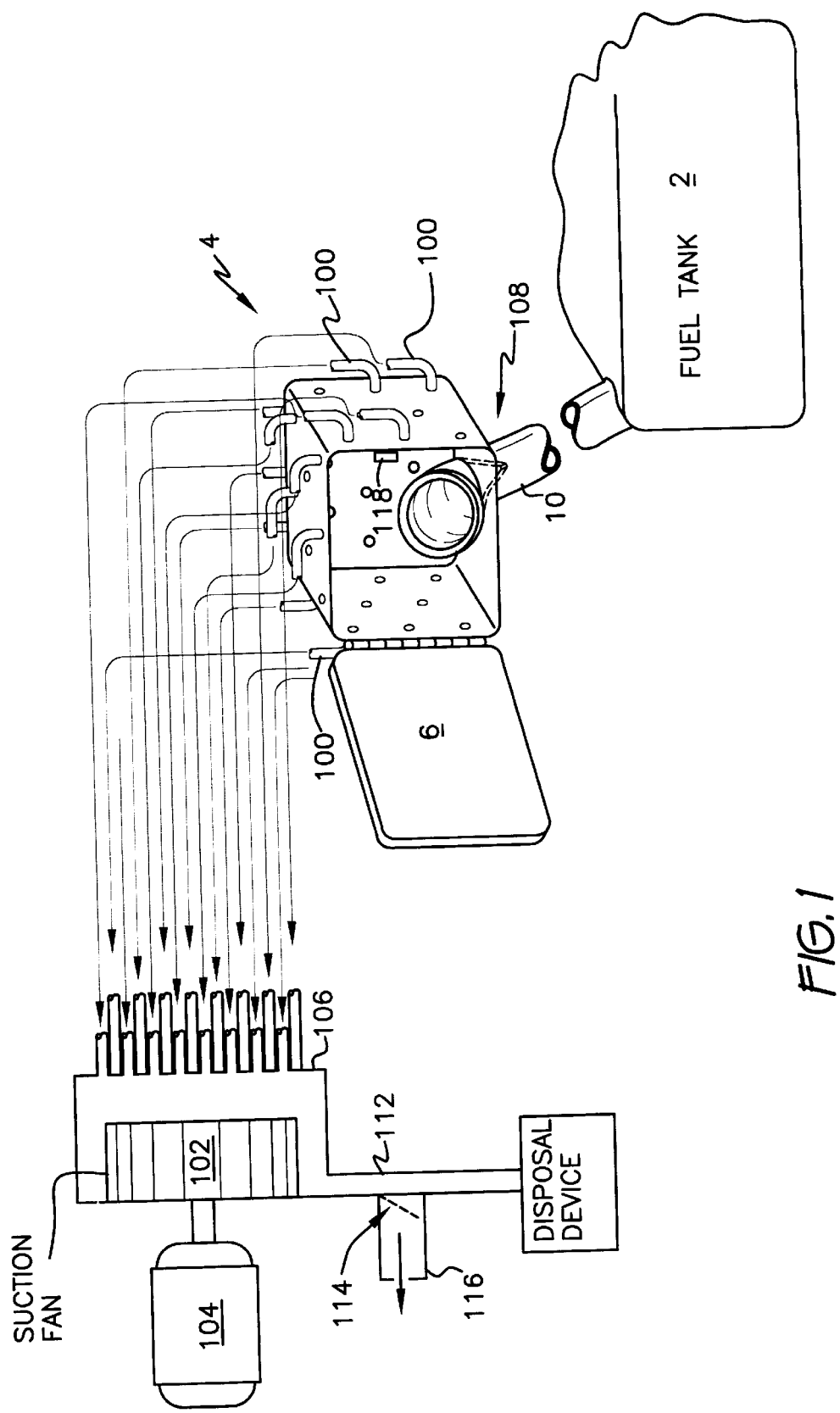
FIG. 1 is an environmental, diagrammatic depiction of a vapor collection system according to the present invention.

FIG. 1 of the drawings shows the significant components of a vapor interception and disposal system according to the present invention. The system is preferably built as part of or added to a liquid fueled motor vehicle having a fuel tank 2, filler neck compartment 4 covered by a door 6, internal combustion engine 8 (see FIG. 2), and electrical system (see FIG. 3). Filler neck compartment 4 has a plurality of collection conduits 100 which open at one end at compartment 4 and which extend to a suction device located remotely from compartment 4. Location of the suction device assures that collected fumes, if not collected or destroyed by engine 8 or the emissions control system (not shown), will be discharged to the ambient atmosphere away from filler neck 10.

The suction device is a blower or fan 102 driven by an electric motor 104. The suction device may be a centrifugal fan, axial fan, vacuum pump or air compressor such as that supplying combustion air to catalytic converter 10 (see FIG. 2), or any device having a power source independent of engine 8 dedicated solely to the suction device, which suction device generates vacuum, or alternatively stated, lowers air pressure below the ambient pressure so as to promote flow of vapors as set forth herein.

Fan 102 is enclosed by a housing 106. The distal ends of collection conduits 100 open to the interior of housing 106 such that vacuum established by operation of fan 102 draws vapors from compartment 4 into housing 106. Fan 102 then propels collected vapors to a suitable disposal point.

The number of collection conduits 100 is not critical, provided that there are sufficient separate, independent conduits 100 communicating between compartment 4 and the suction device. Conduits 100 open to compartment 4 at diverse, spaced apart points, and assure that if one conduit 100 becomes clogged, there will be sufficient others unaffected by clogging as to enable the system to operate as intended.

In addition to collection conduits 100, compartment 4 is optionally provided with a collector 108 disposed beneath filler neck 10. Collector 108 is a funnel or similar structure provided with a flexible, flaccid flapper valve disposed to discharge liquids trapped within collector 108 to below the motor vehicle.

Figure 2:
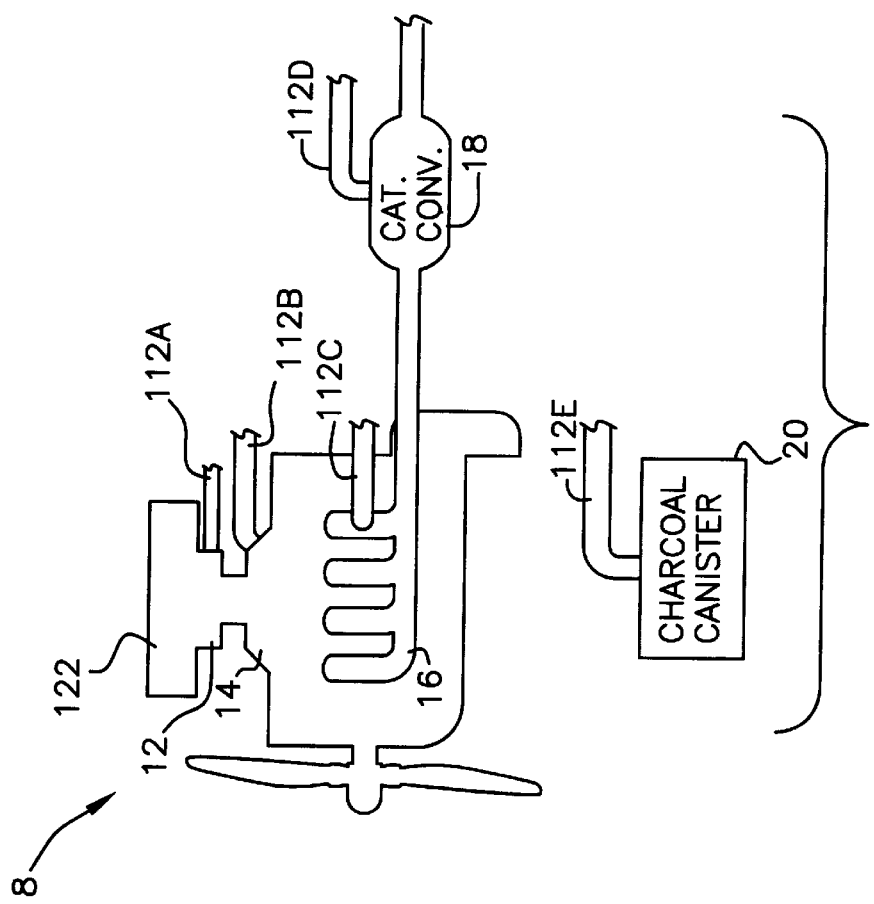
FIG. 2 is an environmental, diagrammatic depiction of connection of the system of FIG. 1 to a motor vehicle associated with the novel system.

Suction fan 102 disposes of collected vapors in the following manner. A disposal conduit 112 opens to the interior of housing 106 and conducts vapors propelled by fan 102 to a suitable disposal device (shown only symbolically in FIG. 1). Suitable disposal devices are shown in FIG. 2. Continuations of disposal conduit 112 of FIG. 1 are represented in FIG. 2 as 112A, connected to throttle body 12, 112B, connected to intake manifold 14, 112C, connected to exhaust manifold 16, 112D, connected to catalytic converter 18, and 112E, connected to a charcoal canister 20 conventionally supplied to trap hydrocarbon fumes. Disposal conduit 112 may terminate in any one of the continuations, or any combination thereof, as desired.

Again referring to FIG. 1, as an alternative to destructive disposal by a component of engine 8 or of the emissions control system, vapors collected by suction fan 102 may be vented directly to the open atmosphere. A valve 114 opens disposal conduit 112 to the atmosphere either directly or through an auxiliary conduit 116. Valve 114 is preferably manually operated, but may be automatically actuated if desired.

Figure 3:
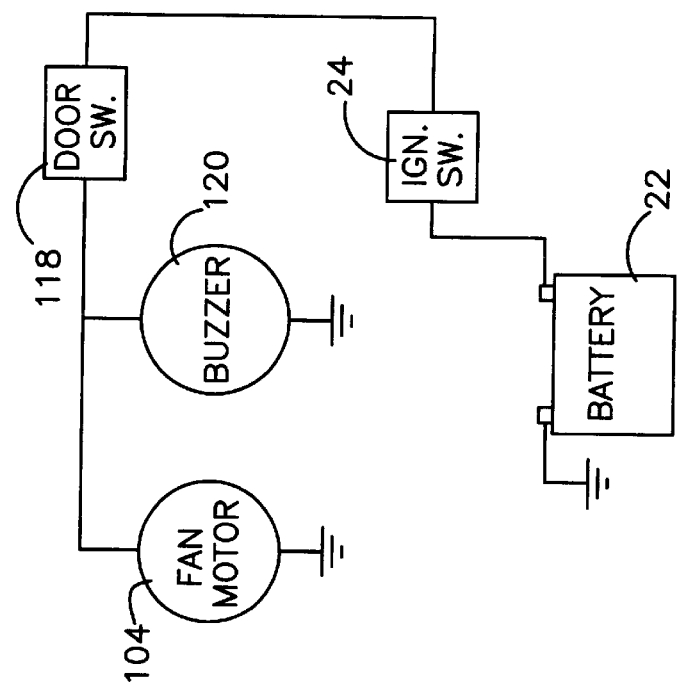
FIG. 3 is an electrical schematic diagram of electrical power and control circuitry of the novel system.

FIG. 3 shows a control and power system which operates motor 104 in a manner enabling operation of the novel system at times when engine 8 is not running. The electrical system of the vehicle includes a battery 22 connected to ignition switch 24. A door switch 118 is located such that when door 6 of compartment 4 is open, electrical contacts (not shown) within switch 118 close, thus closing a power circuit to motor 104 and to a buzzer 120. The circuit serving motor 104 and buzzer 120 is arranged so that power is present only when ignition switch 24 is in the "on" or "accessory" position. This assures that motor 104 will not run at times when it is not necessary. Buzzer 120 provides an audible signal indicating that the vapor interceptor system is operating, and serves as a reminder that ignition switch 24 may be turned to the "off" position. Preferably, buzzer 120 is located at the dashboard (not shown) or elsewhere in the passenger compartment of the vehicle.

The present invention is susceptible to variations and modifications which may be introduced thereto without departing from the inventive concept. For example, buzzer 120 may be replaced by another device producing an audible signal, by an annunciator light, or by both. Collected fumes may be discharged into air filter housing 122, if desired. Refueling may be sensed or inferred by apparatus other than door switch 118.

It is to be understood that the present invention is not limited to the embodiments described above, but encompasses any and all embodiments within the scope of the following claims.

I claim:

1. A vapor interception and disposal system for a liquid fueled motor vehicle having a fuel tank, filler neck compartment, internal combustion engine, and electrical system, comprising:

a) at least one collection conduit having a first end opening to the filler neck compartment, and a second end;

b) a suction device disposed to generate vacuum relative to ambient air pressure, said suction device having a source of power independent of the engine of the motor vehicle, said collection conduit opening at said second end to said suction device; and c) a control system comprising actuation means operatively connected to a cover of said filler neck compartment, said cover being movable between an open and a closed position, and adapted to selectively operate said source of power at times when the engine of the motor vehicle is not running and defendant upon said cover being disposed in said open position.

2. The vapor interception and disposal system for a liquid fueled motor vehicle having a fuel tank, filler neck compartment, internal combustion engine, and electrical system according to claim 1, wherein said at least one collection conduit comprises a plurality of separate, independent collection conduits communicating between the filler neck compartment and said suction device.

3. The vapor interception and disposal system for a liquid fueled motor vehicle having a fuel tank, filler neck compartment, internal combustion engine, and electrical system according to claim 1, wherein said source of power of said suction device is an electric motor.

4. The vapor interception and disposal system for a liquid fueled motor vehicle having a fuel tank, filler neck compartment, internal combustion engine, and electrical system according to claim 3, wherein said actuation means comprises electrical circuitry connected to the electrical system of the motor vehicle and a switch closing said electrical circuitry to said electric motor of said suction device when the door of the filler neck compartment is in said open position, thereby operating said suction device.

5. The vapor interception and disposal system for a liquid fueled motor vehicle having a fuel tank, filler neck compartment, internal combustion engine, and electrical system according to claim 1, wherein said suction device is a fan.

6. The vapor interception and disposal system for a liquid fueled motor vehicle having a fuel tank, filler neck compartment, internal combustion engine, and electrical system according to claim 1, wherein said suction device is arranged to vent collected fumes to the ambient atmosphere away from the filler neck.

7. The vapor interception and disposal system for a liquid fueled motor vehicle having a fuel tank, filler neck compartment, internal combustion engine, and electrical system according to claim 1, further comprising a disposal conduit communicating between said suction device and an emissions control system of the motor vehicle.

8. The vapor interception and disposal system for a liquid fueled motor vehicle having a fuel tank, filler neck compartment, internal combustion engine, and electrical system according to claim 1, further comprising a buzzer disposed to provide an audible signal when said suction device is operating.

9. A vapor interception and disposal system for a liquid fueled motor vehicle having a fuel tank, filler neck compartment including a door, internal combustion engine, and electrical system, comprising:

a) a plurality of separate, independent collection conduits each having a first end opening to the filler neck compartment, and a second end;

b) collector disposed beneath the filler neck adapted to discharge liquids trapped within said collector below the motor vehicle;

c) a suction fan disposed to generate vacuum relative to ambient air pressure, arranged to vent collected fumes to the ambient atmosphere away from the filler neck, wherein said suction fan has an electric motor arranged to drive said suction fan, and wherein said collection conduits open at their respective said second ends to said suction fan;

d) a disposal conduit communicating between said suction fan and the internal combustion engine of the motor vehicle to the open atmosphere; and e) a control system disposed to operate said electric motor power at times when the internal combustion engine of the motor vehicle is not running and when the door of the filler neck compartment of the motor vehicle is open, wherein said control system comprises electrical circuitry adapted to be connected to the electrical system of the motor vehicle, a switch closing said electrical circuitry to said electric motor of said suction fan when the door of the filler neck compartment is open, thereby operating said suction fan, and a buzzer disposed to provide an audible signal when said suction fan is operating.

10. A vapor interception and disposal system for a liquid fueled motor vehicle having a fuel tank, filler neck compartment including a door, internal combustion engine, and electrical system, comprising:

a) a plurality of separate, independent collection conduits each having a first end opening to the filler neck compartment, and a second end;

b) collector disposed beneath the filler neck adapted to discharge liquids trapped within said collector below the motor vehicle;

c) a suction fan disposed to generate vacuum relative to ambient air pressure, arranged to vent collected fumes to the ambient atmosphere away from the filler neck, wherein said suction fan has an electric motor arranged to drive said suction fan, and wherein said collection conduits open at their respective said second ends to said suction fan;

d) a disposal conduit communicating between said suction fan and an emissions control system of the motor vehicle, and a valve disposed to open said disposal conduit to the open atmosphere; and e) a control system disposed to operate said electric motor power at times when the engine of the motor vehicle is not running and when the door of the filler neck compartment of the motor vehicle is open, wherein said control system comprises electrical circuitry connected to the electrical system of the motor vehicle, a switch closing said electrical circuitry to said electric motor of said suction fan when the door of the filler neck compartment is open, thereby operating said suction fan, and a buzzer disposed to provide an audible signal when said suction fan is operating.

\* \* \* \* \*